United States Patent [19]
Cathcart et al.

[11] Patent Number: 5,766,486
[45] Date of Patent: Jun. 16, 1998

[54] HYBRID FILTER SYSTEM AND METHOD FOR FILTERING PROCESS FLUID

[75] Inventors: Norman G. Cathcart, Cortland; Donald B. Stevens, Port Washington, both of N.Y.

[73] Assignee: PALL Corporation, East Hills, N.Y.

[21] Appl. No.: 686,038

[22] Filed: Jul. 25, 1996

Related U.S. Application Data

[60] Provisional application No. 60/001,545 Jul. 27, 1995.

[51] Int. Cl.⁶ .................................................. B01D 29/62
[52] U.S. Cl. ........................... 210/739; 95/1; 95/20; 95/273; 210/741; 210/791
[58] Field of Search ........................... 210/106, 108, 210/138, 139, 143, 323.1, 323.2, 323.01, 739, 741, 767, 791, 321.69, 332; 55/271, 272, 274, 283, 288, 302, 341.1, 341.7, 523; 95/1, 14, 15, 220, 273

[56] References Cited

U.S. PATENT DOCUMENTS

| | | | |
|---|---|---|---|
| 4,264,345 | 4/1981 | Miller. | |
| 4,419,234 | 12/1983 | Miller et al. | 210/323.2 |
| 4,522,717 | 6/1985 | Brust | 210/323.2 |
| 4,767,427 | 8/1988 | Barabas et al. | |
| 5,209,844 | 5/1993 | Zievers et al. | 210/333.01 |
| 5,256,175 | 10/1993 | Zievers et al. | 55/341.1 |
| 5,348,568 | 9/1994 | Oda et al. | 95/20 |
| 5,460,733 | 10/1995 | Rasmussen et al. | 210/333.01 |
| 5,474,585 | 12/1995 | Geibel et al. | 210/333.01 |

FOREIGN PATENT DOCUMENTS

| | | |
|---|---|---|
| 0682971 | 11/1995 | European Pat. Off. . |
| 3835672 | 4/1990 | Germany . |
| 2185418 | 7/1987 | United Kingdom . |
| WO93/14853 | 8/1993 | WIPO . |

*Primary Examiner*—Joseph W. Drodge
*Attorney, Agent, or Firm*—Leydig, Voit & Mayer, Ltd.

[57] ABSTRACT

A hybrid filter system and a method for filtering process fluid utilizing a backwash containment vessel. Tube sheet assemblies designed to hold disposable or backwashable filter elements are utilized to secure either type of filter elements in the backwash containment vessel. The tube sheet assemblies are removably mounted in the backwash containment vessel, and may be easily swapped for a given filtering application. The hybrid filter system utilizes a backwash containment vessel in conjunction with either disposable filter elements or backwashable filter elements depending upon process flow parameters.

13 Claims, 5 Drawing Sheets

HYBRID FILTER SYSTEM AND METHOD FOR FILTERING PROCESS FLUID

This application claims the benefit of U.S. Provisional application Ser. No. 60/001,545, filed Jul. 27, 1995.

BACKGROUND OF THE INVENTION

1. Field of the Invention

The present invention relates to a hybrid filter system and method for filtering a process fluid such as a gas or liquid or mixtures of gas and liquid. More particularly, the present invention relates to a hybrid filter system operable with disposable filter elements and regenerable filter elements and a method for filtering a process fluid using either disposable filter elements or regenerable filter elements.

2. Discussion of the Prior Art

In many filtration applications, the selection of a particular type of filter element presents a relatively simple choice. For example, if the concentration of solids in the particular process fluid is low, a filter system having disposable filter elements may be economically utilized. A disposable filter element is one which is typically removed and discarded after it becomes fouled. Where the concentration of solids in the fluid is low, the disposable filter elements may be used for long periods of time before becoming fouled, thereby making it cost effective to replace the fouled disposable filter elements with clean disposable filter elements each time the filter elements become fouled.

Alternatively, if the concentration of solids in the particular process fluid is high, a filter system having regenerable, e.g., backwashable or backblowable filter elements, may be more economically utilized. A regenerable filter element is one which is typically reused after it has been cleaned by washing liquid through it or blowing gas through it, often in the direction opposite the normal flow direction. Where the concentration of solids in the process fluid is high, the filter elements may become fouled quickly, thereby making it more cost effective to clean and reuse the fouled filter elements rather then replace them. In addition, replacing the filter elements often increases system down time, and may expose the operator to unnecessary risks in the case of filtering hazardous materials.

Regenerable filter systems are typically different than disposable filter systems. For example, both backwashable and disposable filter systems typically comprise a fluid containment vessel, but backwashable filter systems have additional backwash-related pipes connected to the fluid containment vessel in order to supply backwashing fluids, solvents or agents, and pressurized gases, all of which facilitate the backwashing operation. A fluid containment vessel of a disposable filter system typically has none of these pipes because the disposable filter elements are not backwashed. Further, backwashable filter systems typically require large diameter fluid containment vessels with considerable spacing between filter elements so that effective and efficient backwashing may be accomplished. A fluid containment vessel of a disposable filter system having a corresponding flow rate to a backwashable filter system typically has a much smaller diameter because the extra spacing between filter elements is not necessary. Also, backwashing filter systems typically have fluid containment vessels with large diameter drain pipes so that the backwashing fluid and filter element deposits can be quickly washed and removed from the vessel with no substantial pressure drop created at the drain. The drain of a fluid containment vessel of a disposable filter system may be much smaller because large volumes of backwashing fluid and filter element deposits are not regularly removed from the vessel. Additionally, in both backwashable and disposable filter systems the fluid containment vessels typically include a process fluid chamber and a filtrate chamber. The process fluid chamber is the chamber through which the process fluid is introduced into the system, and the filtrate chamber is the chamber in which the filtrate, i.e., the filtered process fluid, is collected. In backwashable filter systems the filtrate chamber is generally larger to accommodate the fluid to be utilized in the backwashing process. The filtrate chamber of a disposable filter may be much smaller because no filtrate needs to be retained for backwashing.

The filter elements utilized in backwashable filter systems are typically different from the filter elements utilized in disposable filter systems. For example, backwashable filter elements typically include additional components. The additional components may be utilized to prevent damage to the backwashable filter elements caused by the larger forces generated by the higher reverse pressure differentials caused by the reverse flow of fluid during backwashing. Thus, the additional components may include robust outer supports such as cages, shells, sleeves, and wraps. Disposable filter elements generally do not comprise these additional components since they are not usually exposed to larger reverse pressure differentials because they are not backwashed. Further, backwashable filter elements typically have smaller diameters and denser filter media to facilitate the deposition of solids in the process fluid on or near the upstream surface of the filter medium and the removal of the solids from the filter media. In backwashable filter systems, a reverse flow of backwash fluid is utilized to remove deposits on the filter elements; accordingly, if the deposits are on or near the upstream surface of the filter elements, the more easily the deposits are removed. The diameter of disposable filter elements is typically larger, and the filter media is less dense in order to increase the filtration surface area and/or the removal efficiency. Since disposable filter elements are not cleaned, they are usually designed to facilitate the removal of as much solids as possible without regard to cleanability.

As stated above, there are many filtration applications in which the selection of a filter system is simple; however, there are also many filtration applications that fall between the two extremes, thereby making the choice of which type of filter system to utilize more difficult and potentially costly. Since currently used filter systems are typically designed as regenerable filter systems or disposable filter systems, there is no flexibility in terms of tailoring the filter system to the particular application. If a regenerable filter system is utilized where the solids concentration is low enough to make disposable filters economical, money has been spent unnecessarily in installing the more expensive regenerable filter system. Conversely, if a disposable filter system is utilized where the solids concentration is high enough to make regenerable filter elements economical, additional money will be spent on unduly replacing disposable filter elements or installing a backwashable filter system. Additionally, the particular filtration application may change over time, e.g., change in solids concentration, and the filter system may not be efficient for the changed conditions. In situations where the filtration application may change, due for example to the changed process flow parameters or even a change in the process fluid, filtering may become expensive because of the ineffectiveness of the particular system. In addition, because of this ineffectiveness of the one system due to changed conditions, two or more separate filter systems may be required, which may be prohibitively expensive.

SUMMARY OF THE INVENTION

In accordance with one aspect, the present invention is directed to a method for filtering process fluid containing solids. The method comprises passing the process fluid into a process fluid chamber of a regenerable filter vessel through an inlet of the regenerable filter vessel, directing the process fluid through a plurality of disposable filter elements mounted in the process fluid chamber, including loading solids on or in the filter medium of the filter elements, directing filtrate from the filter elements into a filtrate chamber of the regenerable filter vessel and then through an outlet of the regenerable filter vessel, and depending on a predetermined loading condition, either (i) replacing the loaded filter elements with disposable filter elements or (ii) replacing the loaded filter elements with regenerable filter elements and connecting a regeneration assembly to the regenerable filter vessel.

In accordance with another aspect, the present invention is directed to a hybrid filter system. The hybrid filter system comprises a regenerable filter containment vessel having a process fluid chamber and a filtrate chamber, a tube sheet, and a plurality of disposable filter elements. The regenerable filter containment vessel also includes an inlet communicating with the process fluid chamber, a drain communicating with the process fluid chamber and sized to effectively drain fluid and filter deposits from the process fluid chamber, an outlet communicating with the filtrate chamber, and a regeneration-related port communicating with the filtrate chamber. The regeneration-related port is capped. The tube sheet is mounted between the process fluid chamber and the filtrate chamber of the regenerable filter containment vessel, and provides a barrier between the process fluid chamber and the filtrate chamber. The tube sheet includes a plurality of openings for the disposable filter elements. The plurality of disposable filter elements are mounted to the tube sheet and extend into the process fluid chamber of the regenerable filter containment vessel. Each disposable filter element comprises a filter medium and an open end which communicates with the filtrate chamber of the backwash filter containment vessel.

Hybrid filter systems and methods of the present invention provide a flexible, low operating cost filtration system and method which exploits the advantages associated with both regenerable filter systems and disposable filter systems in a single system. This is particularly advantageous in applications where it is initially unclear whether a regenerable filter system is preferred or a disposable filter system is preferred.

For example, an exemplary hybrid filter system comprises a backwash containment vessel which may initially be equipped with disposable filter elements. As the process fluid containing solids is passed through the hybrid filter system, the solids are deposited on or in the disposable filter elements and the pressure drop across the disposable filter elements increases. Depending on a predetermined loading condition, such as the amount of time it takes the pressure drop across the disposable filter elements to increase to a maximum desirable value, the fouled disposable filter elements are removed and replaced with either clean disposable filter elements or backwashable filter elements. For example, if it takes a long period of time for the pressure drop across the initial disposable filter elements to increase to the maximum desirable value, then it may be more economical to continue to use disposable filter elements in the hybrid filter system. The fouled disposable filter elements would simply be removed from the backwash containment vessel and clean disposable filter elements would be installed. On the other hand, if it takes a short period of time for the pressure drop across the initial disposable filter elements to increase to the maximum desirable value, then it would be more economical to use backwashable filter elements. The fouled disposable filter elements would be removed from the backwash containment vessel, backwashable filter elements would be installed, and the backwash containment vessel would be connected to a backwashing assembly. The backwashable filter elements could thereafter be backwashed whenever they become fouled.

The exemplary hybrid filter system of the present invention may comprise a regenerable containment vessel and the vessel hardware, including connection pipes such as regeneration-related pipes, instrumentation, manifolding, and flow control valves, as well as the filter elements. The regenerable containment vessel may be divided into upper and lower chambers by a partition such as a tube sheet. The tube sheet may be removably mounted within the regenerable containment vessel, and functions to secure the filter elements, either disposable or regenerable, within the regenerable containment vessel. Accordingly, depending upon the loading condition, the filter elements, either disposable or regenerable, may be easily and quickly swapped by exchanging tube sheets having the filter elements attached thereto or by swapping the filter elements on a tube sheet capable of supporting either type of filter element.

Exemplary hybrid filter systems of the present invention may reduce system down time by providing the flexibility to tailor the system to specific applications. The hybrid filter system also reduces the potential exposure of the system operator to hazardous substances which may be the fluid being filtered or a by-product thereof by minimizing the maintenance frequency.

The exemplary hybrid filter system of the present invention may be utilized in a duplex or tandem arrangement. For example, two or more hybrid filter systems may be interconnected through a valve arrangement such that one hybrid filter system is always in a filtering mode of operation. With this type of arrangement, the filter elements of one hybrid filter system may be regenerated or replaced while the filtering of the process fluid continues uninterrupted in the second hybrid filter system. A third hybrid filter system may also be interconnected into the duplex arrangement as a stand-by unit. For example, if one of the hybrid filter systems should have to be shut down, e.g., during routine maintenance, the third hybrid filter system may simply be brought on line to ensure continuous and uninterrupted filtering of the process fluid.

DESCRIPTION OF THE PREFERRED EMBODIMENTS

As described in the Background section, regenerable filter elements may comprise backwashable and backblowable filter elements. However, for purposes of clarity and simplicity, the detailed description of the exemplary hybrid filter system of the present invention shall make reference to backwashable filter elements in discussing the attributes and advantages of the hybrid filter system and method for filtering process fluids. However, these attributes and advantages may apply equally as well to backblowable filter elements.

An exemplary hybrid filter system of the present invention utilizes a backwash containment vessel which is designed for backwashing, i.e., it is sized for backwashing and it includes the various internal hardware and internal and external connections utilized in backwashing, i.e., backwash-related connections. However, in accordance with one aspect of the invention, the exemplary hybrid filter system may contain within the backwash filter containment vessel either disposable filter elements or backwashable filter elements, thereby exploiting the advantages offered by each type of filter element. Disposable filter elements, which are typically utilized in low solids concentration filtration applications, are generally less expensive individually and have lower maintenance costs associated with them. Backwashable filter elements, which are typically utilized in high solids concentration filtration applications, are generally more expensive individually but may be reused through many filtering and cleaning cycles. Accordingly, the exemplary hybrid filter system has the flexibility to function as either a fully effective disposable filter system or a fully effective backwashable filter system without any compromise in performance. Consequently, the exemplary hybrid filter system is ideal for the many filtration applications where it is initially unclear whether a disposable or backwashable filter system is better. When utilizing disposable filter elements, which may be discarded after a single filtration cycle, the various vessel hardware and connections for performing the backwash operation are closed or sealed. Conversely, when utilizing backwashable filter elements, which may be cleaned and reused after a single filtration cycle, the various vessel hardware and connections are activated and connected to a regeneration assembly, e.g., a backwashing assembly, for performing the backwash operation. The exemplary hybrid filter system may be rapidly configured for either mode of operation by simply adjusting the appropriate system hardware and connections and by swapping a tube sheet holding disposable filter elements with a tube sheet holding backwashable filter elements or vise versa. Preferably, only the filter elements are swapped with the same tube sheet fitting both types of filter elements. The term filter element as used hereafter shall be understood to be a generic descriptor for both types of filter elements unless otherwise specified.

Figure 1:
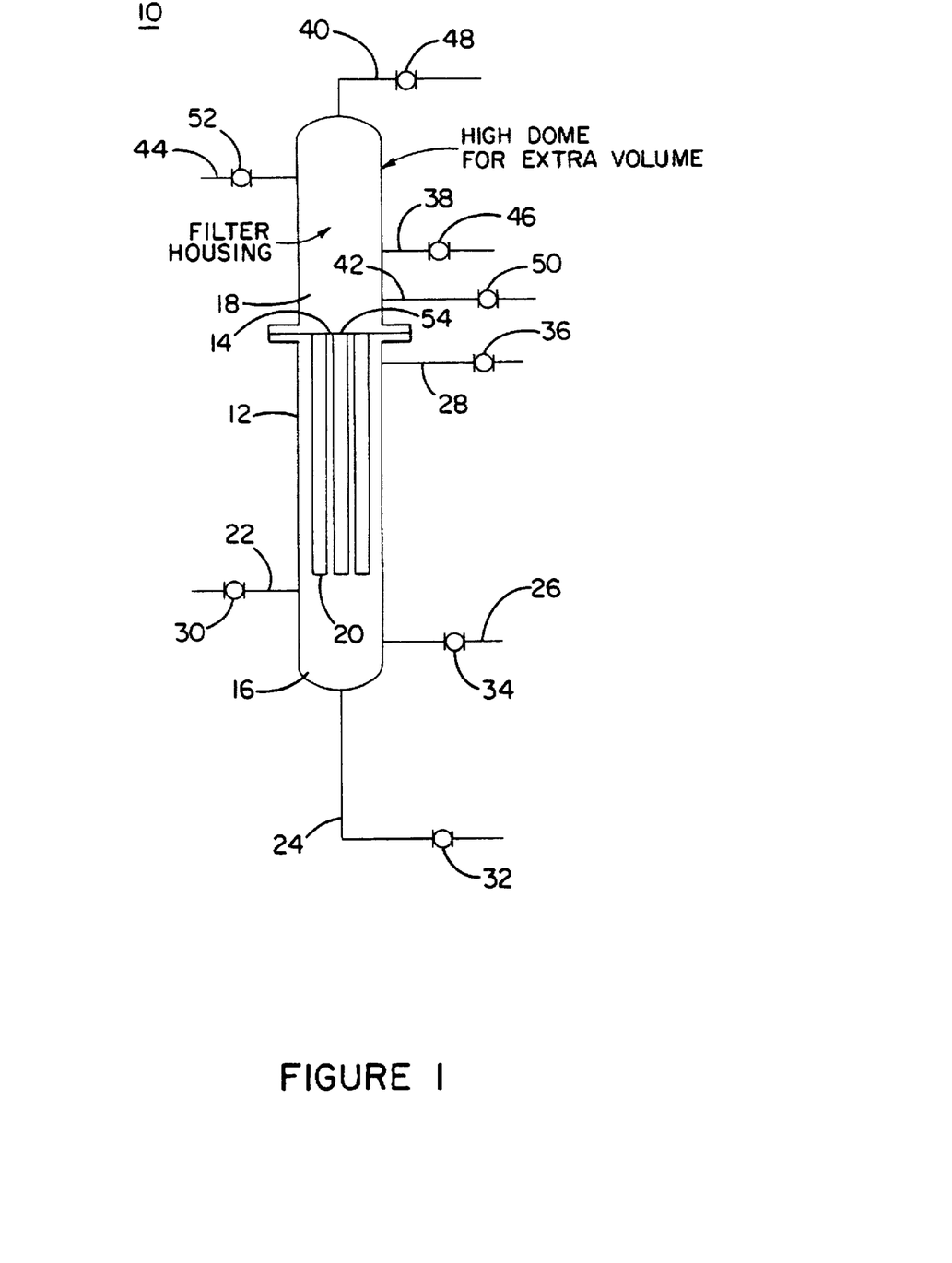
FIG. 1 is a cross-sectional view of an exemplary embodiment of the hybrid filter system of the present invention.

As illustrated in FIG. 1, an exemplary hybrid filter system 10 embodying the present invention includes a backwash containment vessel 12 which is divided by a partition 14, such as a tube sheet, into process fluid chamber 16 and a filtrate chamber 18. One or more filter elements 20, three of which are illustrated, are disposed inside the process fluid chamber 16 and attached to the tube sheet 14.

The backwash containment vessel 12 is preferably constructed so that the filter elements 20 may be readily accessed to permit their replacement or to swap one type of filter element for a second type of filter element. For example, the backwash containment vessel 12 may include first and second sections detachably connected to one another. Alternatively or additionally, one or more sealable access ports may be formed in the backwash containment vessel 12 to permit access to the inside of the process fluid or filtrate chambers 16, 18.

As stated above, the exemplary hybrid filter system 10 may be used both for filtering a fluid by means of disposable or backwashable filter elements, and for cleaning the backwashable filter elements by backwashing. Accordingly, in accordance with one aspect of the invention, the backwash containment vessel 12 is configured as a backwash filter vessel. Generally the shape of the backwash containment vessel 12 will be selected based on strength and backwash considerations so that the backwash containment vessel 12 will have sufficient strength to withstand the pressures exerted on it during filtration or backwashing, and sufficient size to permit effective, efficient filtration and backwashing of the backwash filter elements.

The tube sheet 14 is preferably impervious to fluid flow and is removably mounted to the inner wall of the backwash containment vessel 12 between the process fluid chamber 16 and the filtrate chamber 18. The tube sheet 14 is preferably disposed in the backwash containment vessel 12 substantially horizontally, and the process fluid chamber 16 is preferably disposed below the filtrate chamber 18. The filtrate chamber 18 may be larger to accommodate the fluid, e.g., filtrate, which is utilized to backwash the filter elements 20 if backwashable filter elements are utilized. As explained subsequently the backwash fluid may be an externally supplied fluid or the filtrate retained in the filtrate chamber 18. If the system is utilized with disposable filter elements, then a plug or other means may be positioned in the filtrate chamber 18 to reduce hold-up volume.

A plurality of pipes, conduits, and other connections, including backwash-related connections, may be connected to the backwash containment vessel 12 for introducing fluids into and removing fluids from the backwash containment vessel 12. For example, in the exemplary embodiment, a process fluid feed pipe 22, a drain pipe 24, a solvent feed pipe 26, and a first vent pipe 28 are connected to the backwash containment vessel 12 so as to communicate with the inside of the process fluid chamber 16. The process fluid feed pipe 22 is used to introduce a process fluid to be filtered into the process fluid chamber 16 from an unillustrated source. The drain pipe 24 is used to remove unwanted materials from the process fluid chamber 16 and to drain the process fluid chamber 16. The drain pipe 24 has a larger diameter so that the backwashing fluid and filter element deposits are quickly washed from the filter elements 20 and removed from the backwash vessel 12 with no substantial pressure drop created at the drain. A large drain pipe 24 also increases the effectiveness of any backwash because it enhances the initial surge of backwash fluid through the filter element when the drain is opened during backwashing. The drain pipe 24 may be connected to the process fluid source such that the drainage may be passed through the system again, or it may be connected to a backwash receptacle for disposal of the drainage. The solvent feed pipe 26 is utilized to deliver a soaking material, for example, a detergent into the process fluid chamber 16. This soaking material facilitates the backwashing of the filter elements 20 as is explained in more detail subsequently. The first vent pipe 28 may communicate with the process fluid chamber 16 preferably just below the partition 14. The first vent pipe 28 may be utilized to simply vent gases from the process fluid chamber 16 or to facilitate draining of the process fluid chamber 16 by providing chase gas. The process fluid feed pipe 22, the drain pipe 24, the solvent feed pipe 26, and the vent pipe 28 may be equipped with corresponding control valves 30, 32, 34, 36 for controlling the flow through these pipes 22, 24, 26, and 28, respectively.

Additionally, in the exemplary hybrid filter system, a filtrate discharge pipe 38, a second vent pipe 42, and backwash-related connections such as a pressurized gas feed pipe 40 and a backwash liquid feed pipe 44 may be connected to the backwash containment vessel 12 so as to communicate with the inside of the filtrate chamber 18. The filtrate discharge pipe 38 is used to remove filtrate, i.e., fluid which has passed through the filter elements 20 from the process fluid chamber 16 into the filtrate chamber 18. The pressurized gas feed pipe 40 supplies the filtrate chamber 18 with a compressed gas from a charge vessel illustrated in FIG. 5. The second vent pipe 42 is utilized to simply vent gases from the filtrate chamber 18 or to facilitate drainage of the filtrate chamber 18 by providing chase gas. The backwash liquid feed pipe 44 may be utilized to introduce an externally supplied backwash fluid into the filtrate chamber 18 for backwashing the filter elements 20 or to supplement the filtrate backwash if the system is equipped with backwashable filter elements. The filtrate discharge pipe 38, the pressurized gas feed pipe 40, the second vent pipe 42, and the backwash liquid feed may be equipped with corresponding control valves 46, 48, 50, and 52 for controlling the flow through these pipes.

All control valves for the various pipes may be controlled manually, or they can be automatically controlled, e.g., made to operate according to a prescribed sequence by an unillustrated control unit.

In the illustrated exemplary embodiment, each pipe serves a single function, but it is possible to have a single pipe serve a plurality of functions. Furthermore, the figures are merely a schematic representation, and the locations of the connections on the backwash containment vessel 12 are not limited to those shown in the figures and fewer or more connections may be provided.

The tube sheet 14 as discussed above functions as a fluid impervious partition between the process fluid chamber 16 and the filtrate chamber 18 of the backwash containment vessel 12. The tube sheet 14 comprises a plurality of openings 54 in which the filter elements 20 are mounted. If less than all of the openings 54 are utilized for reasons explained subsequently, they may be sealed. The size of the openings 54 may vary depending on the size of the particular filter elements 20 utilized. As discussed above, the diameter of the backwashable filter elements are typically different from the diameter of disposable filter elements; therefore, adaptors may be utilized if a single tube sheet 14 is utilized. The tube sheet 14 may be formed out of any suitable rigid material able to support the filter elements 20, and which will not react with the process fluids or gases passed into the system, including polymeric materials or metallic materials.

For each of the filter elements 20, an opening which communicates between the process fluid chamber 16 and filtrate chamber 18 is formed in the tube sheet 14 as explained above. Each filter element 20 is connected at one end to the tube sheet 14 so that fluid from the process fluid chamber 16 can enter the opening 54 only by first passing through the filter element 20. Preferably, the filter elements are detachably mounted on the tube sheet 14 so that they hang vertically in the process fluid chamber 16. By hanging the filter elements 20 below tube sheet 14 in the process fluid chamber 16, backwashing and removal of the filter element deposits through the drain pipe 24 are greatly enhanced.

The filter elements 20 generally range in size from one inch or less to two inches or more in outside diameter; however, custom sized filter elements may also be easily utilized. In this exemplary embodiment, each filter element 20 is disposed entirely within the process fluid chamber 16, although it is possible for the filter elements 20 to extend part way into the filtrate chamber 18. Each filter element 20 may also be connected at the other end to a porous support plate, not shown, which extends across the backwash containment vessel 12 parallel to the tube sheet 14. The support plate functions to secure the filter elements 20 in position, and maintain them in a substantially parallel orientation.

Figure 2A:
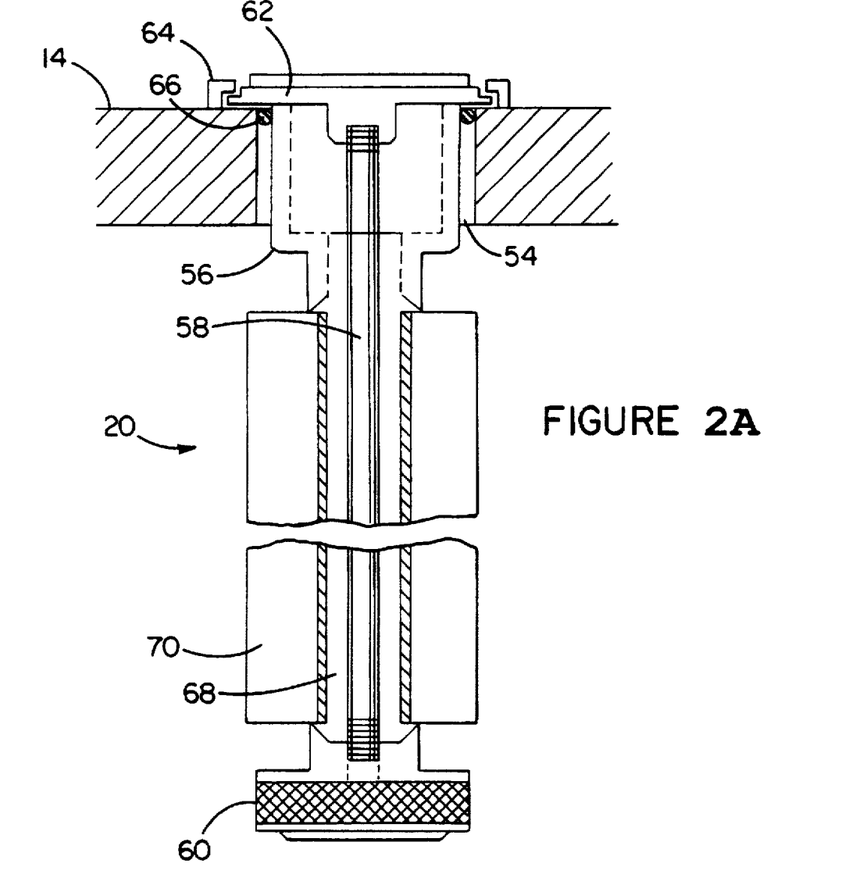
FIG. 2A is a detailed diagrammatic representation of a tube sheet and disposable filter element of the hybrid filter system of the present invention.
Figure 2B:
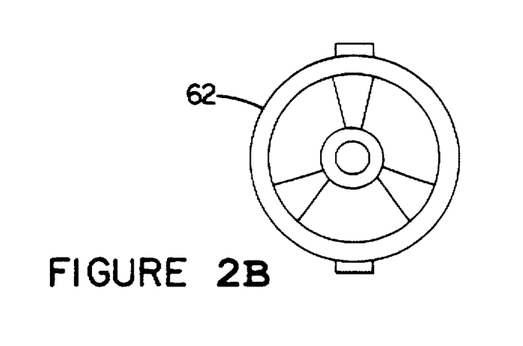
FIG. 2B is a top view of the filter element of FIG. 2A.

In accordance with another aspect of the invention, the filter elements in the backwashable filter containment vessel 12 may be either disposable or backwashable filter elements. FIG. 2A is a detailed representation of a disposable filter element 20 mounted to the tube sheet 14, and FIG. 2B is a top view of the filter element of FIG. 2A. In the exemplary illustrated embodiment, an upper portion of the disposable filter element 20 comprises an adaptor 56 which is disposed within the opening 54 in the tube sheet 14. The adaptor 56 for use with the disposable filter elements 20 may have a diameter less than the diameter of the disposable filter elements 20. Since the tube sheet 14 may be utilized for both types of filter elements 20 and typically the two types of filter elements have different diameters, adaptors are utilized to secure the particular filter elements 20 in a universally sized opening 54. The adaptor 56 has an opening so that filtrate may flow from the interior of the disposable filter element 20 through the tube sheet 14 into the filtrate chamber 18. A tie rod 58 may be utilized to secure the disposable filter element 20 to the tube sheet 14. A seal nut 60 may be threaded onto a lower end of the tie rod 58 and a locking connector 62 may be threaded onto an upper end of the tie rod 58. The locking connector 62 is basically a wheel structure having spokes to provide openings for filtrate to flow from disposable filter element 20 into the filtrate chamber 18. The diameter of the locking connector 62 is preferably larger than the diameter of the opening 54 in the tube sheet 14 such that the filter element 20 may be secured by tightening the locking connector against the tube sheet 14. In addition, clips 64 on the tube sheet 14 may also secure the locking connector 62 to the tube sheet 14. In addition, o-rings 66 may be utilized in the annular gap between the inner wall of the openings 54 in the tube sheet 14 and the outer wall of the adaptor 56 to provide a fluid tight seal.

Figure 3:
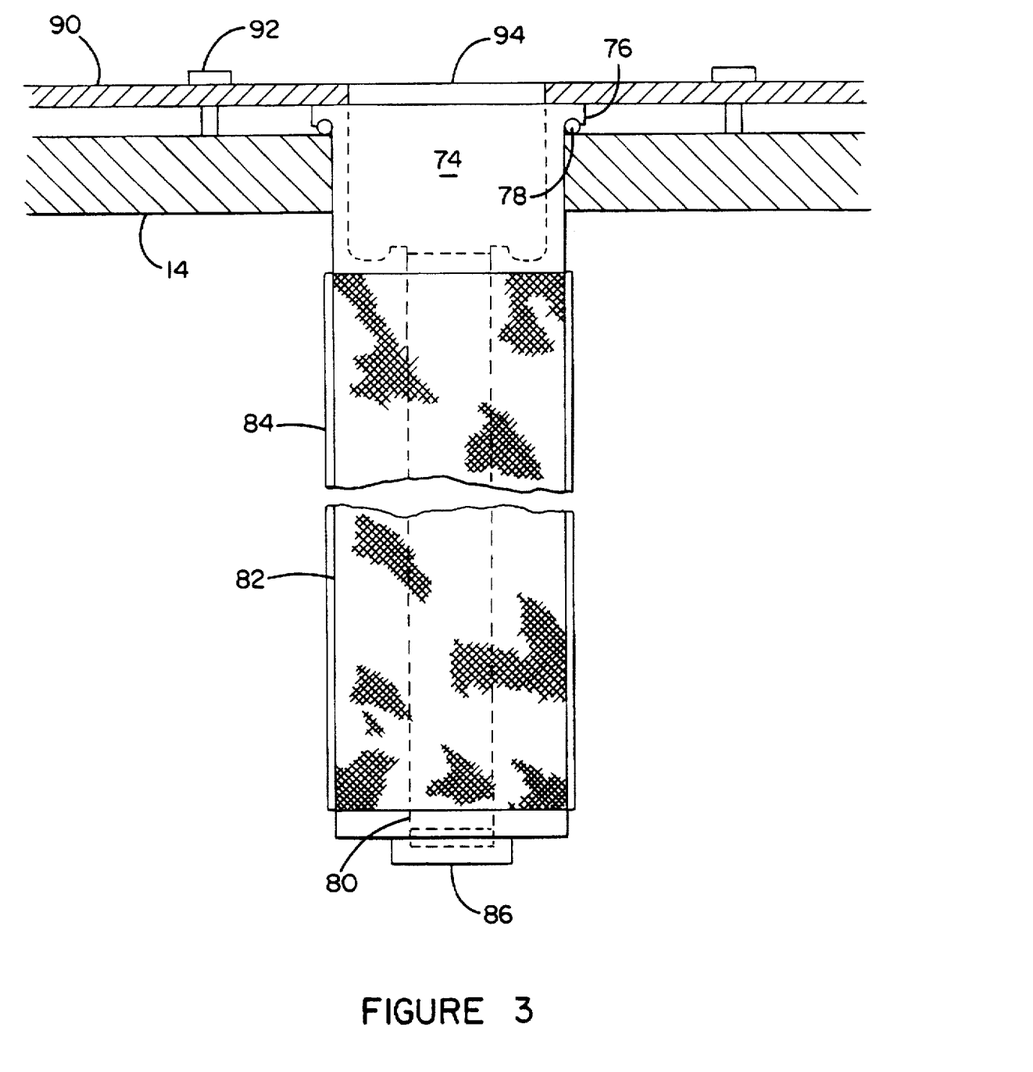
FIG. 3 is a detailed diagrammatic representation of a tube sheet and a regenerable filter element of the hybrid filter system of the present invention.

FIG. 3 is a detailed representation of a backwashable filter element 20 mounted to the tube sheet 14. As illustrated, the backwashable filter element 20 comprises an adaptor 74 which is simply inserted into the opening 54 in the tube sheet 14. A lip 76 or flange on the upper portion of the adaptor 74 rests upon the upper surface of the tube sheet 14. An o-ring seal 78 may be disposed between 9 the lip 76 and the tube sheet 14 to provide a fluid tight seal. In addition to the tube sheet 14, a tube sheet assembly may include a hold down plate 90 positioned over the adaptors 74 to secure the filter elements 20 in place. The hold down plate 90 may be mounted to the tube sheet 14 by bolts 92 or any other suitable securing means openings 94 in the hold down plate 90 correspond to openings in the tube sheet 14 and the adaptor 74 for fluid flow.

Figure 4:
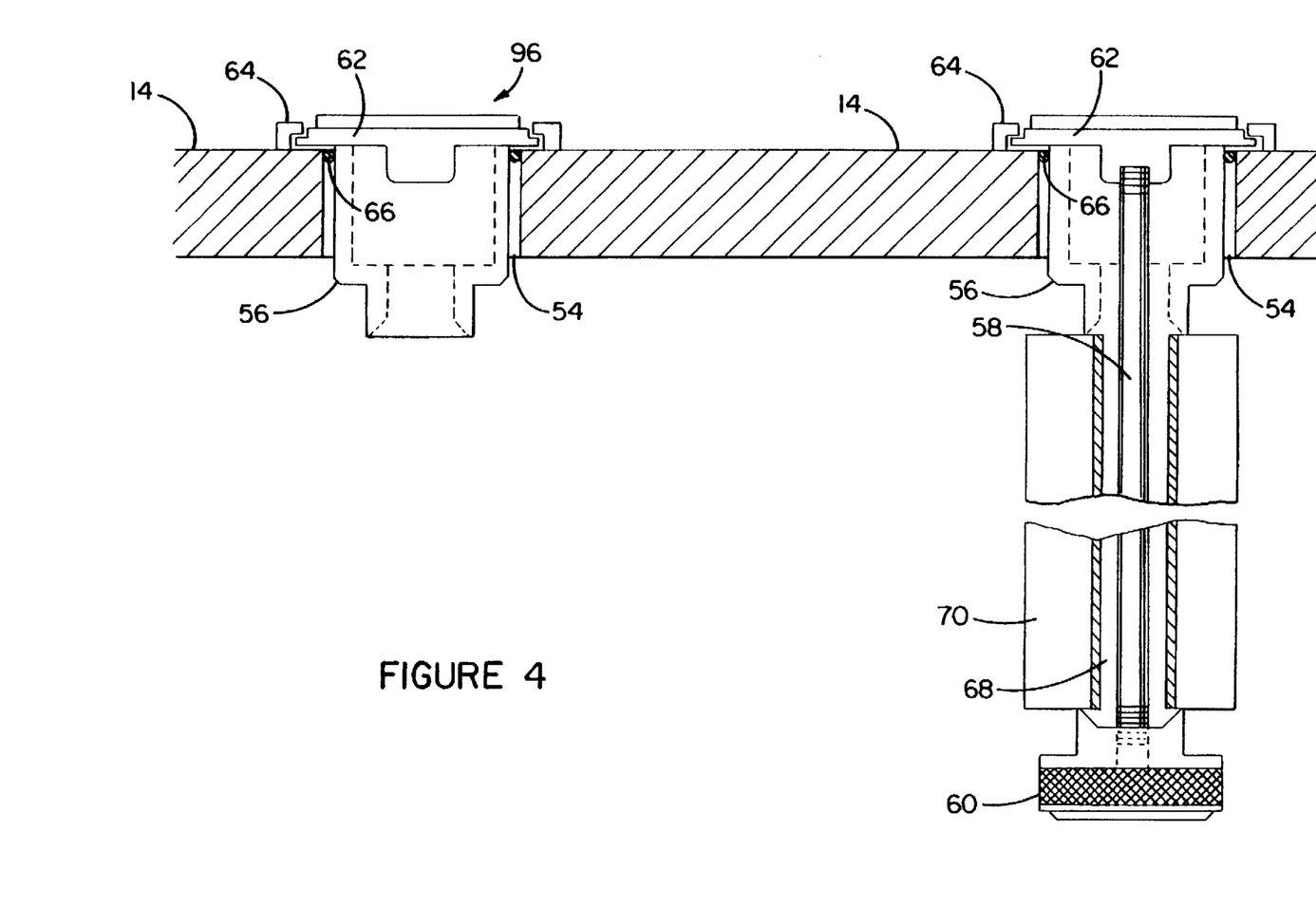
FIG. 4 is a detailed diagrammatic representation of a tube sheet with sealed holes.

FIG. 4 illustrates a tube sheet 14 having a blind adaptor 96 sealing one of the openings 54 in the tube sheet 14. Blind adaptors 96 may be utilized when fewer filter elements than openings are utilized. For example, when disposable filter elements are utilized, typically fewer filter elements are employed than if backwashable filter elements are utilized for the reasons discussed subsequently. Accordingly, the extra openings in the tube sheet 14 may be covered with the blind adaptors 96.

As illustrated in FIGS. 2A and 4 the exemplary disposable filter element 20 preferably comprises a perforated cylindrical core 68 and a filter medium 70 mounted on the core 68. The core 68 may comprise any suitably rigid, perforate material which is able to support the filter medium 70 from collapsing from the force of the process fluid during filtration. The core 68 may comprise polymeric materials or metallic materials.

The filter medium 70 may comprise any suitably porous pleated or non-pleated, surface or depth filter medium such as a porous membrane, a fibrous sheet or mass, or a porous sheet or mass of sintered material, e.g., a sintered metal or ceramic. For example, the filter medium 70 may comprise a synthetic or non-synthetic microporous material such as polypropylene, nylon, cellulose, Halar, aramid, Ryton, or fiberglass. The filter element may also include an open end which communicates with the filtrate chamber 18 and a blind end or an open end blinded by an end cap or connector in the process fluid chamber 16.

The backwashable filter element 20 may also comprise a perforated cylindrical core 80 and a filter medium 82 mounted on the core 80. The core 80 may comprise any suitably rigid perforate material which is able to support the filter medium 82 from collapsing from the force of the process fluid during filtration. The core 80 may comprise polymeric materials or metallic materials. The filter medium 82 may also comprise any suitably porous pleated or non-pleated, surface or depth filter medium such as a porous membrane, a fibrous sheet or mass, or a porous sheet or mass of sintered material, e.g., a sintered metal or ceramic. For example, the filter medium 70 may comprise a synthetic or non-synthetic microporous material such as polypropylene, nylon, polyolefin, Halar, aramid, Ryton, fiberglass, or any suitable metal alloy. The backwashable filter element 20 may also comprise an outer support structure 84 to protect and support the filter medium 82 during backwashing. The backwashable filter element may also include an open end which communicates with the filtrate chamber 18 and a blind end or an open end blinded by an end cap or connector 86 in the process fluid chamber 16.

The fluid containment vessel described above may generally be described as a backwash containment vessel which is distinguishable from fluid containment vessels typically utilized with disposable filter elements. Backwash containment vessels, as discussed above, have additional pipes or conduits connected to the two chambers. These additional pipes may be utilized to supply solvents, backwash fluids, and pressurized gases to the vessel in order to perform the backwash operation. Backwash containment vessels typically have larger diameters. Larger diameter backwash containment vessels facilitate the backwash operation by providing additional room for the deposits on the filter elements to be removed by either a reverse flow of fluid or by a pressure pulse from a compressed gas. Backwash containment vessels also typically have larger drain pipes. Larger diameter drain pipes facilitate the removal of the backwash material from the backwash filter vessel by ensuring no reverse pressure build-up. Additionally, backwash filter vessels generally have larger downstream chambers so that filtrate may be contained within the vessel for backwashing or so that a backwashing liquid may be contained in the vessel for backwashing.

Backwashable filter elements are typically different than disposable filter elements in a number of respects. For example, backwashable filter elements may comprise additional components for structural support. Generally, backwashable filter elements comprise outer support structures including cages, meshes, sleeves, shells, and wraps. These outer support structures are preferably porous structures so that fluid easily flows through them in order to avoid creating large pressure differentials. The outer support structures may be placed over the upstream region of the filter elements, i.e., upstream in relation to fluid flow path during normal filtration. The outer support structure provides structural support for the filter medium when backwashing occurs. Since backwashing causes larger pressure differentials in the reverse flow direction, which in turn generate larger forces acting on the filter element in the reverse flow direction, strong, robust outer support structures are used to prevent damage to the filter medium caused by the backwash flow. The outer support structure as discussed above may include cages, meshes, sleeves, shells, and wraps, and may be constructed from various materials including polymeric materials and metallic materials. In contrast, the disposable filter elements generally do not comprise outer support structures, or comprise much less robust outer support structures, because the filter elements may not be subjected to the forces generated by backwashing.

In addition, generally, backwashable filter elements are designed to facilitate the removal of deposited solids on the filter elements. Accordingly, it would be preferable that the solids be deposited on or near the upstream surface of the filter medium so that the reverse backwashing flow can easily wash away the deposits. Therefore, denser filter media are typically utilized to ensure that the solids are preferentially deposited on or near the upstream surface of the filter medium. In contrast, disposable filter elements may have a structure which resists effective backwashing.

In addition to the individual aspects enumerated above for the disposable versus backwashable vessels and filter elements, the configuration of the filter elements within the backwash containment vessel as well as the operation of the two types of systems are different. Generally, the process fluid flux rate for each individual filter element is preferably lower for backwashable filter elements than disposable filter elements in order to prevent solids from penetrating deeply within the filter medium of the backwashable filter element. The lower flux rate tends to facilitate the preferential deposition of solids on or near the upstream surface of the filter medium of the backwashable filter element. Accordingly, for a given set of process conditions, e.g., flow rates, the number as well as the size of backwashable filter elements should be selected in order to achieve the desired flux rate. Typically, because of the lower flux rates per element, larger numbers of backwashable filter elements may be utilized in a particular application so that the process parameters, e.g., flow rates from the input to the output of the filter system, are maintained. Since disposable filter elements have larger diameters, typically fewer elements are utilized. Accordingly, if one tube sheet is utilized in conjunction with disposable filter elements, the extra openings in the tube sheet may be sealed with blinded adaptors as explained above.

The hybrid filter system embodying the invention may be operated in a variety of ways. Factors influencing the mode of operation principally include the particular process conditions for the particular application, e.g., the characteristics of the process fluid and the solids concentrations and the desired flow rate and pressure drop. Accordingly, in order to more clearly set forth the operation of the hybrid filter system, a general description of the filtration operation is given and the particular differences between operation with disposable filter elements and backwashable filter elements is given with respect to the exemplary embodiments shown in FIGS. 1–5.

Upon installation, the hybrid filter system comprises a backwash containment vessel 12 with disposable filter elements 20 disposed in the vessel 12. Backwashable filter elements may be initially installed in the backwash containment vessel 12. However, disposable filter elements 20 are preferred initially because they are typically less expensive than backwashable 16 filter elements. All of the backwash-related connections, e.g., the pressured gas pipe 40 and the backwash fluid feed pipe 44, are preferably closed or capped and no backwash assembly is connected to the backwash containment vessel 12. During filtration, all of the control valves except the fluid feed valve 30 and the filtrate discharge valve 46 are typically closed. A process fluid to be filtered is introduced into the process fluid chamber 16 through the process fluid feed pipe 22 and is passed through filter media of the disposable filter elements 20. The filtrate then passes along the hollow interior of the disposable filter elements 20, through the openings 54 in the tube sheet 14, and into the filtrate chamber 18. The filtrate then leaves the filtrate chamber 18 through the filtrate discharge pipe 38 and may be collected in an unillustrated reservoir, for example. Usually, during filtration, the process fluid chamber 16 will be completely filled with the process fluid, and the filtrate chamber 18 will be completely filled with filtrate.

With the backwash containment vessel 12 equipped with disposable filter elements 20, normal filtering operation is initiated as described above, and the system is monitored to determine when fouling of the filter elements 20 occur. There are many ways to determine when fouling of the filter element occurs, including monitoring of the pressure differential between the inlet and the outlet of the filter system and/or simply examining the filter elements after a predetermined time. Preferably, a pressure sensor is utilized to determine the pressure differential.

For a given set of process flow parameters for a given application, a loading condition can be determined for the filter elements. The loading condition may be determined according to a variety of parameters, but the most preferable parameters are the pressure differential across the filter elements and the time interval. For example, the loading condition can be determined according to an acceptable range of values for the pressure differential for a given period of time. In other words, in a particular filtration application, after a given period of filtering time, for example one hour, the pressure differential across the disposable filter elements can be determined and compared to a range of pressure differentials that are acceptable. If the pressure differential is on the high side of this range or higher than this range, then it may reasonably be assumed that the solids concentration in the fluid is so high that it would be too costly to continue using disposable filter elements. If the pressure differential is on the low side of the range or less than the range, then it may be reasonably assumed that the solids concentration in the fluid is so low that disposable filter elements should continue to be used. The range of acceptable pressure differentials for a given filtration time period may be referred to as a predetermined loading condition.

Alternatively, the loading condition may be determined according to an acceptable interval of time to achieve a given pressure differential. In other words, in a particular filtration application, after a given pressure differential across the disposable filter elements is reached, the filtration time interval can be determined and compared to a range of time intervals that are acceptable. If the time interval is on the high side of this range or higher than this range, then it may reasonably be assumed that the solids concentration in the fluid is so low that disposable filter elements 20 should continue to be used. If the time interval is on the low side of the range or less than the range, then it may reasonably be assumed that the solids concentration in the fluid is so high that it would be too costly to continue using disposable filter elements 20. The range of acceptable filtration time intervals to reach the given pressure differential may also be referred to as a predetermined loading condition.

Depending on the loading condition, the fouled disposable filter elements initially installed in the backwash containment vessel 12 may be replaced by clean disposable filter elements or clean backwashable filter elements. Of course, if the loading condition indicates that backwashable filter elements should be installed in the backwash containment vessel 12, it will also be desirable to open or uncap the backwash-related connections of the backwash vessel 12 and connect the backwash containment vessel 12 to a backwash assembly. It is important to note that the monitoring of the system may be an ongoing process as conditions may change. For example, if the initial loading conditions indicate that disposable filter elements may still be used, the system may be continued to be monitored in case the solids concentration changes over time.

Figure 5:
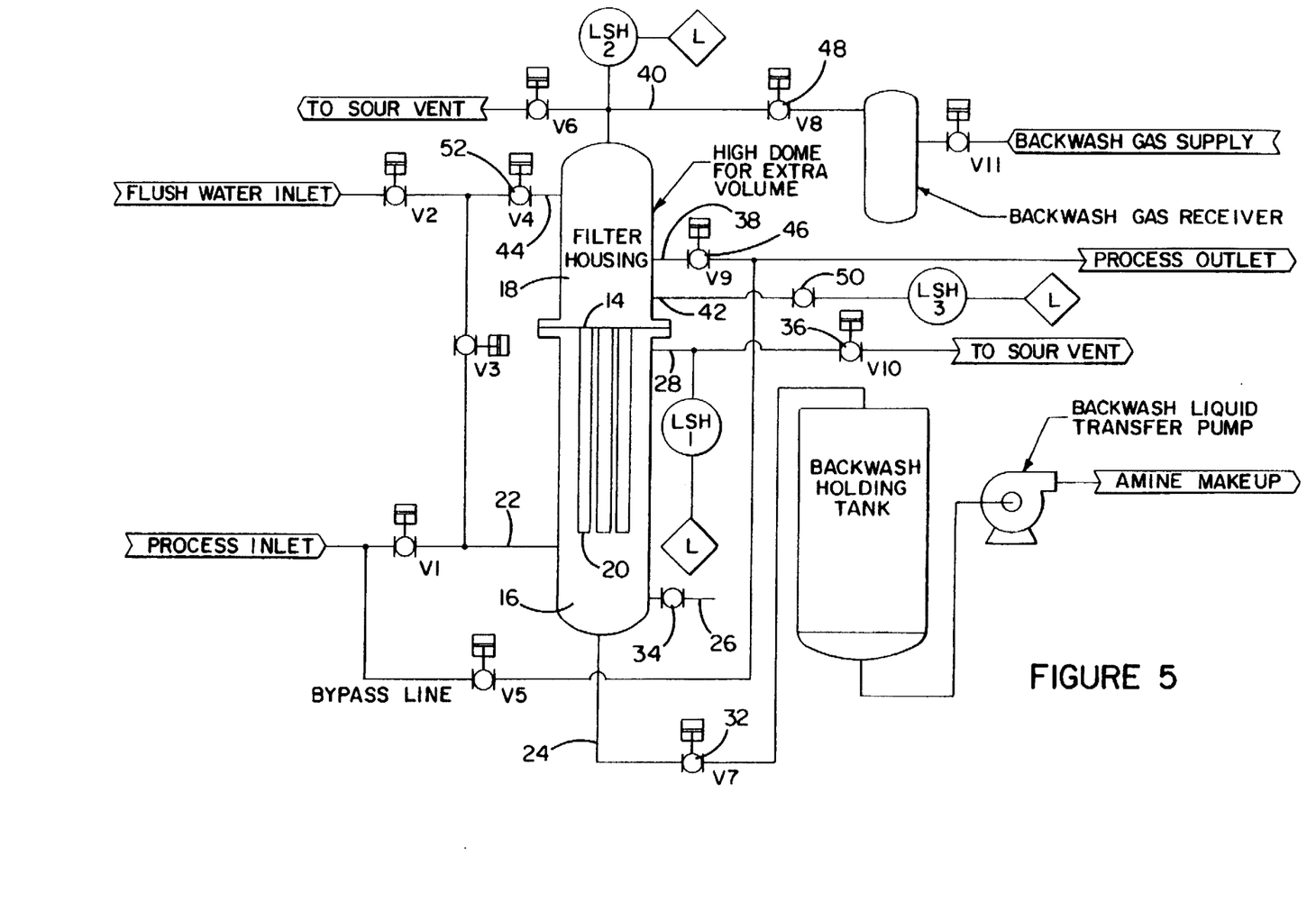
FIG. 5 is a schematic representation of the hybrid filter system and a regeneration assembly.

There are many well known backwash assemblies and backwashing techniques which are effective and may be utilized with a hybrid filtration system. In a preferred embodiment, the backwash technique may be a gas assisted backwash technique utilizing the filtrate as the backwash fluid. FIG. 5, illustrates the hybrid filter system connected to a backwashing assembly. However, other fluids may be utilized as the backwash fluid. An externally supplied backwash fluid may be stored in a backwash holding tank connected to a backwash feed pipe.

According to one example of a suitable gas assisted backwashing technique, the process fluid inlet pipe 22 and the filtrate discharge pipe 38 are closed via valves 30 and 46 and the process fluid is drained to an appropriate level in the process fluid chamber 16, i.e., below the filter elements 20. The drain valve 32 is then closed. Control valves 30, 34, 36, 46, and 50 are also closed, thereby sealing pipes 22, 26, 28, 38, and 42. With these pipes sealed and the filtrate chamber 18 containing the backwash fluid and pressurized, for example, via the pressurized gas feed pipe 40 the backwashable filter elements 20 may be backwashed. The filtrate chamber 18 is pressurized to any suitable backwash pressure, for example, to about seventy to ninety psi. With the filtrate chamber 18 pressurized and the backwash liquid accumulated in the interiors of the filter elements 20 and the filtrate chamber 18, the lower drain valve 32 is opened, venting the process fluid chamber 16 directly through the lower drain pipe 24, and venting the filtrate chamber 18 through the lower drain pipe 24 via the backwashable filter elements 20. Accordingly, the backwash liquid and the gas in the filtrate chamber 18 are forced through the backwashable filter elements 20, dislodging the particulate cake and solids from each backwashable filter element 20 and cleaning each backwashable filter element 20 of particulate matter. The lower drain pipe 24 generally has a larger diameter. Larger diameter drain pipes facilitate the removal of the backwash material from the backwash filter vessel 12.

The pressurized gas provides the energy for backwashing. Any gas which is compatible with the hybrid filter system, the backwashing liquid, and the process fluid may be used. Frequently, compressed air or nitrogen is used. In particular, the increased pressure in the filtrate chamber 18 causes a pressure pulse to abruptly force the backwash liquid accumulated above and in the interiors of the filter elements 20 to flow in the reverse direction through the backwashable filter elements 20 when the drain valve 32 is opened. The force of the outwardly flowing backwash liquid dislodges the particulate matter trapped in or near the outer surface of the backwashable filter elements 20, and the solids matter is blown out the vessel through the drain pipe 24 together with the backwash liquid.

Backwashing may be continuous, flushing all of the backwash liquid contained in the filtrate chamber 18 through the filter elements 20 in one continuous stream, or discontinuous. For example, after a predetermined period of time or after a predetermined amount of backwash liquid has been flushed through the filter elements 20, the lower drain valve 32 may then be closed, allowing any backwash liquid in the filtrate chamber to fill the interiors of the filter elements. The filtrate chamber 18 is then repressurized and another backwashing cycle may be initiated. Similar backwashing cycles may be continued as long as there is sufficient backwashing liquid in the second chamber or as long as backwashing liquid is supplied to the filtrate chamber 18.

The hybrid filter system of the present invention may be equipped with any suitable mechanism for automatically determining when the backwash liquid is at a suitable level, such as a level sensor disposed in the vessel or a timer. The level of the backwash liquid in the filtrate chamber will depend upon many factors, including the size of the backwashable filter elements and the amount of backwashing liquid which it is desired to flush through the backwashable filter elements. For some embodiments, the level of the backwash liquid may be selected so that the volume of the backwash liquid ranges from about one to about ten times the total volume of the interiors of all of the filter elements.

The characteristics of the reverse pressure pulse, e.g., the magnitude of the differential pressure between the filtrate chamber 18 and the process fluid chamber 16 and the duration of the pulse, may vary depending on such factors as the ability of the filter elements to withstand reverse pressure differentials and the desired reverse flow velocity for cleaning the filter elements.

Although what is shown and described is believed to be the most practical and preferred embodiments, it is apparent that departures from specific methods and designs described and shown will suggest themselves to those skilled in the art and may be used without departing from the spirit and scope of the invention. The present invention is not restricted to the particular constructions described and illustrated, but should be construed to cohere with all modifications that may fall within the scope of the appended claims.

What is claimed:

1. A method for filtering process fluid containing solids comprising:

passing the process fluid into a process fluid chamber of a regenerable filter vessel through an inlet of the regenerable filter vessel;

directing the process fluid through a plurality of disposable filter elements mounted in the process fluid chamber, including loading solids on or in the filter medium of the disposable filter elements;

directing filtrate from the disposable filter elements into a filtrate chamber of the regenerable filter vessel and then through an outlet of the regenerable filter vessel;

monitoring a parameter indicative of a degree of loading of the disposable filter elements;

comparing either the parameter or a time t for which the process fluid has passed through the disposable filter elements when the parameter is monitored with a corresponding reference value;

replacing the disposable filter elements with clean disposable filter elements in response to the comparison indicating loading of the disposable filter elements slower than a predetermined rate; and replacing the disposable filter elements with clean regenerable filter elements and connecting a backwash system to the regenerable filter vessel in response to the comparison indicating loading of the disposable filter elements faster than the predetermined rate.

2. The method according to claim 1, wherein monitoring the parameter comprises measuring a pressure differential across the disposable filter elements.

3. The method according to claim 2, comprising measuring the pressure differential across the disposable filter elements after the process fluid has passed through the disposable filter elements for a given period of time, wherein the reference value comprises a reference pressure differential corresponding to the given period of time, and wherein if the measured pressure differential is above the reference value, the disposable filter elements are replaced with clean regenerable filter elements, and if the measured pressure differential is below the reference value, the disposable filter elements are replaced with clean disposable filter elements.

4. The method according to claim 3, wherein if the disposable filter elements are replaced with clean regenerable filter elements:

the parameter indicative of the degree of loading of the regenerable filter elements is monitored, either the parameter or a time t for which the process fluid has passed through the regenerable filter elements when the parameter is monitored is compared with a corresponding reference value, the regenerable filter elements are regenerated if the comparison indicates loading of the regenerable filter elements faster than the predetermined rate, and the regenerable filter elements are replaced with clean disposable filter elements if the comparison indicates loading of the regenerable filter elements slower than the predetermined rate.

5. The method according to claim 2, comprising measuring a time for which the process fluid has passed through the disposable filter elements when the pressure differential across the disposable filter elements reaches a predetermined value, wherein the reference value comprises a reference time corresponding to the predetermined value, and wherein if the measured time is less than the reference value, the disposable filter elements are replaced with clean regenerable filter elements, and if the measured time is greater than the reference value, the disposable filter elements are replaced with clean disposable filter elements.

6. The method according to claim 5, wherein if the disposable filter elements are replaced with clean regenerable filter elements:

the parameter indicative of the degree of loading of the regenerable filter elements is monitored, either the parameter or a time t for which the process fluid has passed through the regenerable filter elements when the parameter is monitored is compared with a corresponding reference value, the regenerable filter elements are regenerated if the comparison indicates loading of the regenerable filter elements faster than the predetermined rate, and the regenerable filter elements are replaced with clean disposable filter elements if the comparison indicates loading of the regenerable filter elements slower than the predetermined rate.

7. The method according to claim 1, wherein replacing the disposable filter elements with clean regenerable filter elements includes mounting to a tubesheet which separates the process fluid chamber and the filtrate chamber of the regenerable filter vessel a plurality of regenerable filter elements greater in number than the number of disposable filter elements being replaced.

8. The method according to claim 7 wherein the regenerable filter vessel and the regenerable filter elements respectively comprise a backwashable filter vessel and backwashable filter elements and wherein regenerating comprises backwashing.

9. The method according to claim 1, wherein replacing the disposable filter elements includes replacing a tube sheet mounted between the process fluid chamber and the filtrate chamber.

10. A method for filtering process fluid containing solids comprising:

passing the process fluid into a process fluid chamber of a regenerable filter vessel through an inlet of the regenerable filter vessel;

directing the process fluid through a plurality of regenerable filter elements mounted in the process fluid chamber, including loading solids on or in the filter medium of the regenerable filter elements;

directing filtrate from the regenerable filter elements into a filtrate chamber of the regenerable filter vessel and then through an outlet of the regenerable filter vessel;

monitoring a parameter indicative of a degree of loading of the regenerable filter elements;

comparing either the parameter or a time t for which the process fluid has passed through the regenerable filter elements with a corresponding reference value;

replacing the regenerable filter elements with clean disposable filter elements in response to the comparison indicating loading of the regenerable filter elements slower than a predetermined rate; and regenerating the regenerable filter elements in response to the comparison indicating loading of the regenerable filter elements faster than the predetermined rate.

11. A method for filtering a process fluid comprising:

(a) filtering a process fluid with filter elements disposed in a filter vessel;

(b) monitoring a parameter indicative of a degree of loading of the filter elements;

(c) comparing either the parameter or a time t for which the process fluid has passed through the filter elements when the parameter is monitored with a corresponding reference value;

(d) in response to the comparison indicating loading of the filter elements slower than a predetermined rate, performing subsequent filtering of the process fluid following the comparison using disposable filter elements which are replaced without being regenerated upon becoming loaded; and (e) in response to the comparison indicating loading of the filter elements faster than the predetermined rate, performing subsequent filtering of the process fluid following the comparison using regenerable filter elements which are regenerated upon becoming loaded.

12. The method according to claim 11 including repeating steps (c) through (e) after filter element replacement or regeneration.

13. The method according to claim 11 wherein the filter elements in step (a) are disposable filter elements which are disposed prior to steps (d) and (e).

* * * * *